US011989731B2

(12) United States Patent
Sharma et al.

(10) Patent No.: US 11,989,731 B2
(45) Date of Patent: May 21, 2024

(54) SYSTEMS AND METHODS FOR PROVISIONING ACCOUNTS

(71) Applicant: MASTERCARD INTERNATIONAL INCORPORATED, Purchase, NY (US)

(72) Inventors: Prashant Sharma, Madison, NJ (US); Rajat Maheshwari, Singapore (SG)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 56 days.

(21) Appl. No.: 17/834,582

(22) Filed: Jun. 7, 2022

(65) Prior Publication Data

US 2022/0300981 A1  Sep. 22, 2022

Related U.S. Application Data

(62) Division of application No. 16/705,618, filed on Dec. 6, 2019, now Pat. No. 11,373,186.

(60) Provisional application No. 62/777,463, filed on Dec. 10, 2018.

(51) Int. Cl.
  *G06Q 20/40* (2012.01)
  *G06Q 20/32* (2012.01)
  *G06Q 20/34* (2012.01)
  *G06Q 20/36* (2012.01)

(52) U.S. Cl.
  CPC ... *G06Q 20/40145* (2013.01); *G06Q 20/3227* (2013.01); *G06Q 20/3278* (2013.01); *G06Q 20/352* (2013.01); *G06Q 20/367* (2013.01)

(58) Field of Classification Search
  None
  See application file for complete search history.

(56) References Cited

U.S. PATENT DOCUMENTS

| 7,146,159 B1 | 12/2006 | Zhu |
| 9,235,839 B2 | 1/2016 | Dua |
| 2012/0317628 A1* | 12/2012 | Yeager ................. G06Q 20/352 726/5 |
| 2014/0252087 A1 | 9/2014 | Kushevsky et al. |
| 2016/0307186 A1* | 10/2016 | Noë ..................... G06Q 20/204 |
| 2020/0184482 A1 | 6/2020 | Sharma et al. |

FOREIGN PATENT DOCUMENTS

WO    WO2016/003831    1/2016

* cited by examiner

*Primary Examiner* — Scott S Trotter
*Assistant Examiner* — Amit Patel
(74) *Attorney, Agent, or Firm* — Harness, Dickey & Pierce, P.L.C.

(57) ABSTRACT

Systems and methods are provided for use in provisioning accounts to mobile devices. One example method includes receiving, at a mobile device, a request to provision an account to a mobile device; prompting a user associated with the account for authentication at a wireless device associated with the account; receiving an account credential from the wireless device, via a local wireless communication between the mobile device and the wireless device, when the user is authenticated at the wireless device; transmitting the account credential toward a first party associated with the account, whereby the account credential is indicative of the authentication of the user; and provisioning the account to the mobile device, in response to an approval received from the first party.

18 Claims, 3 Drawing Sheets

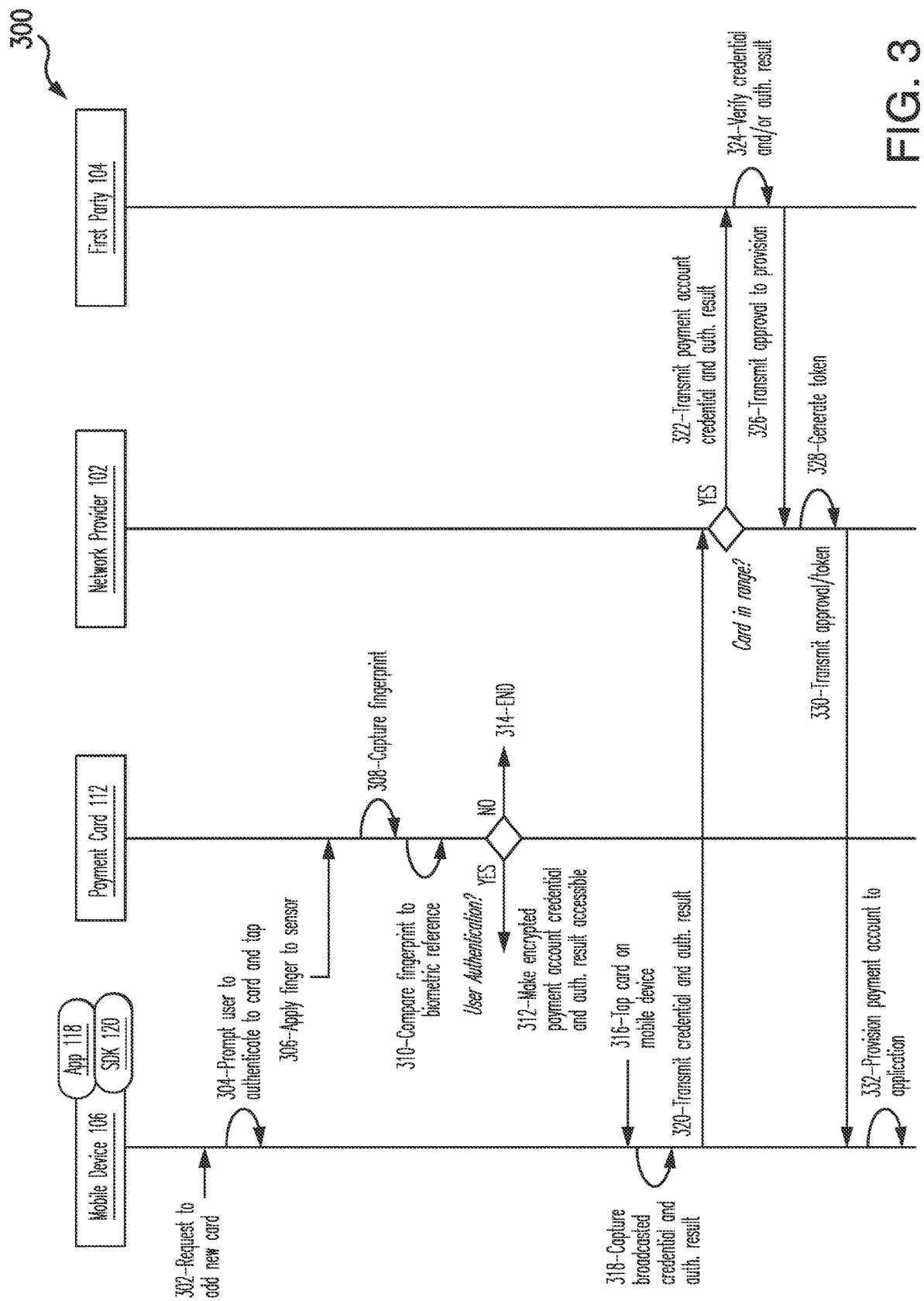

SYSTEMS AND METHODS FOR PROVISIONING ACCOUNTS

CROSS-REFERENCE TO RELATED APPLICATIONS

This application is a divisional of U.S. patent application Ser. No. 16/705,618 filed Dec. 6, 2019, which claims the benefit of, and priority to, U.S. Provisional Application No. 62/777,463 filed on Dec. 10, 2018. The entire disclosure of each of the above-referenced applications is incorporated herein by reference.

FIELD

The present disclosure is generally directed to systems and methods for use in provisioning accounts to mobile devices and, in particular, to systems and methods for use in provisioning accounts to applications within the mobile devices, through local contactless communications between the mobile devices and devices associated with the accounts.

BACKGROUND

This section provides background information related to the present disclosure which is not necessarily prior art.

Payment accounts are known to be used to fund transactions for the purchase of products (e.g., goods, services, etc.) from merchants. In connection therewith, users are known to present payment cards to the merchants, as means of presenting payment account credentials associated with the users' payment accounts. More recently, users have relied upon wallet applications, in mobile devices, to pass payment account credentials to merchants in connection with transactions. In order to provision the payment accounts to the wallet applications, users are required to provide the payment account credentials to the wallet applications and then perform multi-factor authentications for the payment accounts, for example, by way of telephone calls to issuing banks or via one-time passcodes.

DRAWINGS

The drawings described herein are for illustrative purposes only of selected embodiments and not all possible implementations, and are not intended to limit the scope of the present disclosure.

FIG. 3 illustrates an exemplary method, which may be implemented in connection with the system of FIG. 1, for use in provisioning a payment account, associated with a wireless enabled card device, to an application of a mobile device.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When physical payment cards are issued to users, the users have the option to use the physical cards or to provision the cards to virtual wallets. In order to provision the cards to virtual wallets, issuers of the payment cards (and underlying payment accounts) will often require, for security purposes, two-factor authentication, making the process to provision the payment cards cumbersome.

Uniquely, the systems and methods herein provide for improved provisioning of wireless devices (such as contactless payment cards), associated with accounts (such as payment accounts), to applications (such as wallet applications) of mobile devices. As an example, certain payment cards may be enabled to authenticate a user, through biometrics, and also to communicate wirelessly (i.e., via contactless communication) with devices in the vicinity of the payment cards. For such payment cards, wallet applications may be enabled to prompt the users associated with the payment cards to tap the payment cards on mobile devices (which include the wallet applications) and thereby authenticate the payment cards (and/or users associated with the cards) at the mobile devices. The payment cards will then provide one or more payment account credentials to the mobile devices, potentially, along with authentication results. The mobile devices, in turn, then communicate with issuers of the underlying payment accounts to approve and/or enable, based on the on-card authentications of the users, provisioning of the payment accounts to the mobile devices. When provisioned in this manner, friction and/or delay associated with conventional two-factor authentication, when implemented by other provisioning means, is avoided.

Figure 1:
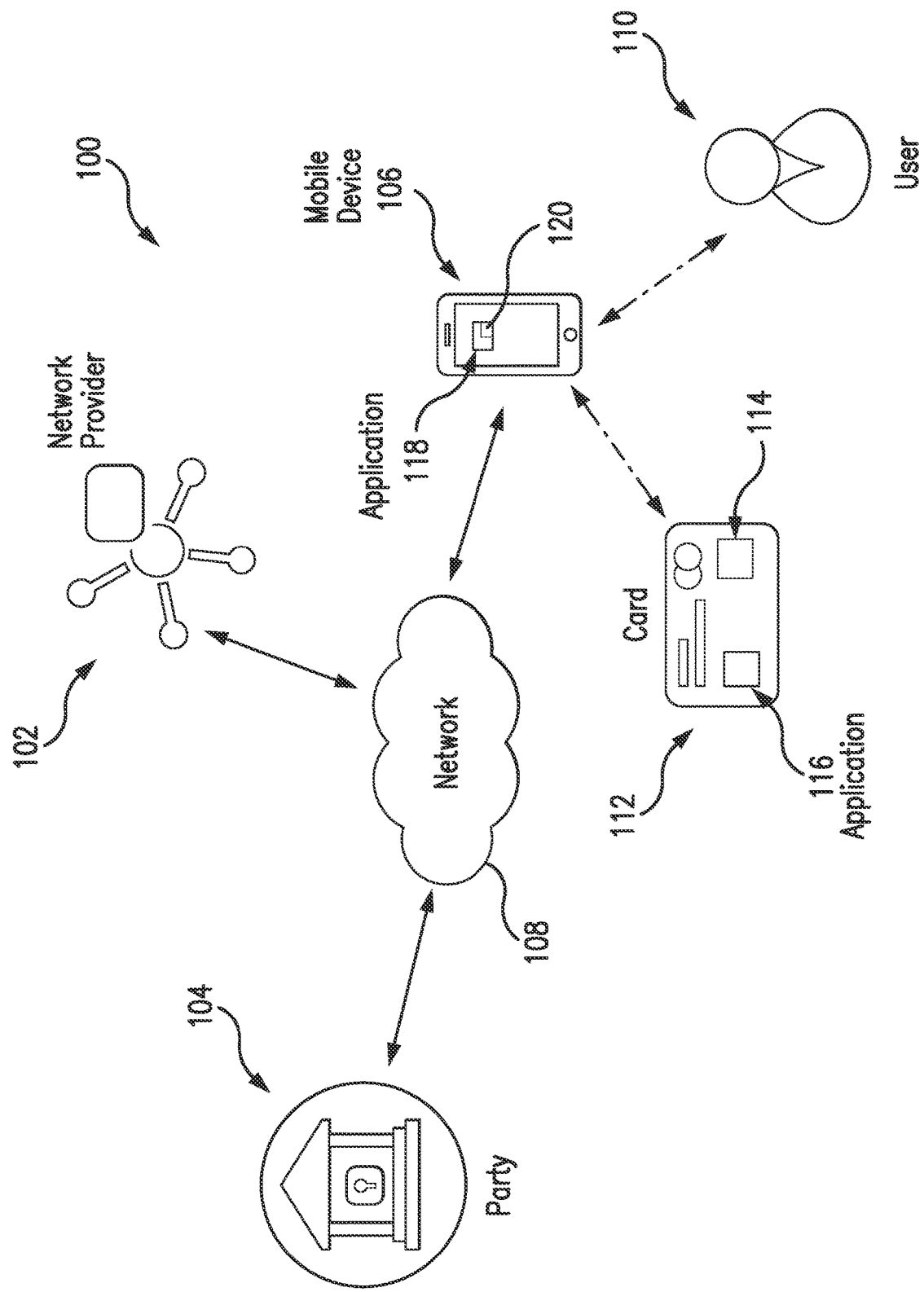
FIG. 1 illustrates an exemplary system of the present disclosure suitable for use in provisioning accounts to mobile devices.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users and identification providers and/or third parties in the system 100, particular types of devices utilized with digital identities, particular mobile applications associated with the users, relationships between users and relying parties in the system 100, privacy requirements, etc.

The system 100 generally includes a network provider 102, a first party 104, and a mobile communication device 106, each of which is coupled to a network 108. The network 108 may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, in at least one embodiment, the network 108 may include a private network through which the network provider 102 is coupled to the first party 104, and a public network (e.g., the Internet, etc.) through which the mobile communication device 106 is coupled to the network provider 102, for example.

In the illustrated system 100, the network provider 102 includes a payment services provider or a payment network, which is configured to facilitate payment account transactions between different entities (e.g., between consumers and merchants and involving financial institutions, etc.), whereby funds are transferred among accounts associated with users of the accounts pursuant to the transactions. In one example, the network provider 102 is configured to coordinate authorization, clearing and settlement for payment account transactions by and through acquirer banking institutions (e.g., on behalf of merchants, etc.) and issuer banking institutions (e.g., on behalf of consumer users, etc.). That said, in general, the network provider 102 is provided herein to coordinate validation of user authentications to/from parties associated with accounts provided to the users, including, for example, the first party 104. In various embodiments, the network provider 102 may employ a digital enablement service, configured to operate as described herein, to support such user identity validation, etc. One example of such a digital enablement service includes the Mastercard Digital Enablement Service™ or MDES (provided by Mastercard™).

The first party 104 in the system 100 may include (or may be referred to herein as) a financial institution, which includes a company, a business or another entity through which entities and/or users may be able to transfer, hold and/or manage funds or other financials, etc. With that said, in the illustrated system 100, the first party 104, in general, provides or issues payment accounts to entities or users, through which the entities or users are permitted to hold funds, transfer funds to/from other accounts, etc.

And, the mobile device 106 in the system 100 is associated with a user 110. The user 110 is associated with an identity, which is evidenced by documents associated with the user 110, such as, for example, a birth certificate, a driver's license, a passport, etc. In addition, the identity of the user 110 is also defined by and/or associated with certain biometrics, such as, for example, fingerprints, a palm print, a retina pattern, an iris pattern, a facial image, or other body measurements and/or calculations specific to the user 110, etc.

In this exemplary embodiment, the user 110 is also associated with a payment card 112 (broadly, a card device), which is linked to a payment account issued to the user 110 by the first party 104. In connection therewith, the payment card 112 may be subject to and comply with the ISO/IEC 7810 ID-1 standard, which generally indicates the physical dimensions and/or dimensional proportions of the payment card 112 (e.g., the payment card 112 may have dimensions of about 3.375 inches (about 85.60 mm) in width by about 2.125 inches (about 53.98 mm) in height, etc.) (although this is not required in all embodiments). In addition, and as described above, the payment card 112 may be used in purchase transactions at physical merchant locations. As such, the payment card 112 may also include an EMV chip, a magnetic strip, and/or a network interface processor, etc., associated therewith (and/or included thereon) comprising data regarding the user's payment account (e.g., payment account credentials for the user's payment account, etc.), etc. and whereby the payment card 112 is then configured to communicate such data as described next. That said, it should be appreciated that the payment card 112 may be subject to other standards in other embodiments, and/or may have different physical dimensions, etc.

The payment card 112 is further enabled for contactless communication (such that the payment card 112 may be viewed as a wireless device), through an embedded chip and/or antenna therein (e.g., a processor and/or network interface as described below in FIG. 2, etc.). In this manner, for example, the payment card 112 may be configured to conform to one or more near-field communication or NFC standards (to enable such contactless communication). NFC permits two-way interactions between different devices (e.g., between the mobile device 106 and the payment card 112, etc.) through elements in existing standards for contactless card technology, such as, for example, ISO/IEC 14443 A&B, JIS-X 6319-4, etc. In connection therewith, such NFC interaction may offer communication speeds of up to about 424 kbps.

As further shown in FIG. 1, the payment card 112 includes a biometric sensor 114, which is structured to capture a biometric (e.g., such as those described above, etc.) from the user 110. It should be appreciated that when registered to the user 110, through a process defined, managed, controlled, etc., by the first party 104, a reference biometric for the user 110 is stored in memory of the payment card 112, for use in authenticating the user 110. In this exemplary embodiment, the biometric sensor 114 includes a capacitive fingerprint sensor, which generates an image of ridges and valleys of the fingerprint of a user applied to the sensor 114. The payment card 112 and/or the biometric sensor 114 is further configured to convert the generated image to a biometric template for comparison to the reference biometric therein (i.e., to determine a "match" or a "non-match" consistent with industry standards for matching biometrics (e.g., sufficient matching, etc.)) (e.g., by the mobile communication device 106, by the payment card 112 (such as by a processor associated therewith, etc.), etc.). In the illustrated embodiment, the biometric sensor 114 is located toward an edge portion of the payment card 112 to allow for convenient access thereto by the user 110, for example, when the user 110 is holding the payment card 112 between figures, etc. (e.g., when the user 110 pinches the payment card 112 between a thumb and a finger, etc.).

Moreover, the payment card 112 also includes an application 116 therein (e.g., a processing device therein, etc.), which configures the payment card 112 to interact with the mobile device 106. The application 116 may also configure the payment card 112 to provide the "match" or "non-match" of the comparison of the biometric template (to the reference biometric) as a Boolean value to the mobile device 106, as appropriate (and as described in more detail hereinafter) and, in some embodiments, to actually perform the biometric comparison that results in the "match" or "non-match" output. In addition, the payment card 112 may further include a key, which is usable in encryption. The key is provided with the payment card 112 when issued, and known by other entities within FIG. 1, to enable encryption/decryption of data being transferred to and from the payment card 112 (e.g., the reference biometric when/if transmitted, the biometric template when/if transmitted, the Boolean value when transmitted, payment account credentials when transmitted, etc.). The configuration of the payment card 112 is further described below.

As also shown in FIG. 1, the mobile device 106 includes a network-based application 118, which is downloaded to and/or installed in the mobile device 106. In the illustrated embodiment, the application 118 is a payment application, in that it configures the mobile device 106 to pass a payment account credential associated with a payment account to a merchant (or other entity) in connection with a payment account transaction (e.g., when the mobile device 106 is used as a payment device in such transaction, etc.). As such, the application 118 may include a virtual wallet application, an electronic wallet application (or an e-wallet application), etc. Exemplary ones of such application 118 may include, for example, PayPass® from Mastercard®, Apple Pay® from Apple®, PayWave® from VISA®, SamsungPay® from Samsung®, etc., or other wallet-type applications.

What's more, in this exemplary embodiment, the application 118 optionally includes a software development kit (SDK) 120. The SDK 120 is provided by and/or associated with the network provider 102 and configures the mobile device 106 and/or the application 118 to interact with the network provider 102, the first party 104, and/or the payment card 112, etc., for provisioning the payment account associated with the payment card 112 to the mobile device 106 (and specifically, the application 118). It should be appreciated that the SDK 120 may be omitted from the system 100, and specifically, the application 118, when the application 118 is provided from the network provider 102 and/or the first party 104. In such embodiments, the application 118 itself, rather than the SDK 120, would configure the mobile device 106 to interact with the network provider 102, the first party 104, and/or the payment card 112, etc.

It should be appreciated that while the network provider 102 is illustrated as a single entity and/or computing device in FIG. 1, the network provider 102 may be segregated into multiple different entities and/or computing devices in other embodiments. However, even in such embodiments, the network provider 102, overall, is still generally configured to operate as described herein. In addition, while only one network provider 102, one first party 104, one mobile device 106, one mobile application 118, one user 110, and one payment card 112 are illustrated in the system 100, it should be appreciated that additional ones of these entities and/or parts may be included in other system embodiments.

Figure 2:
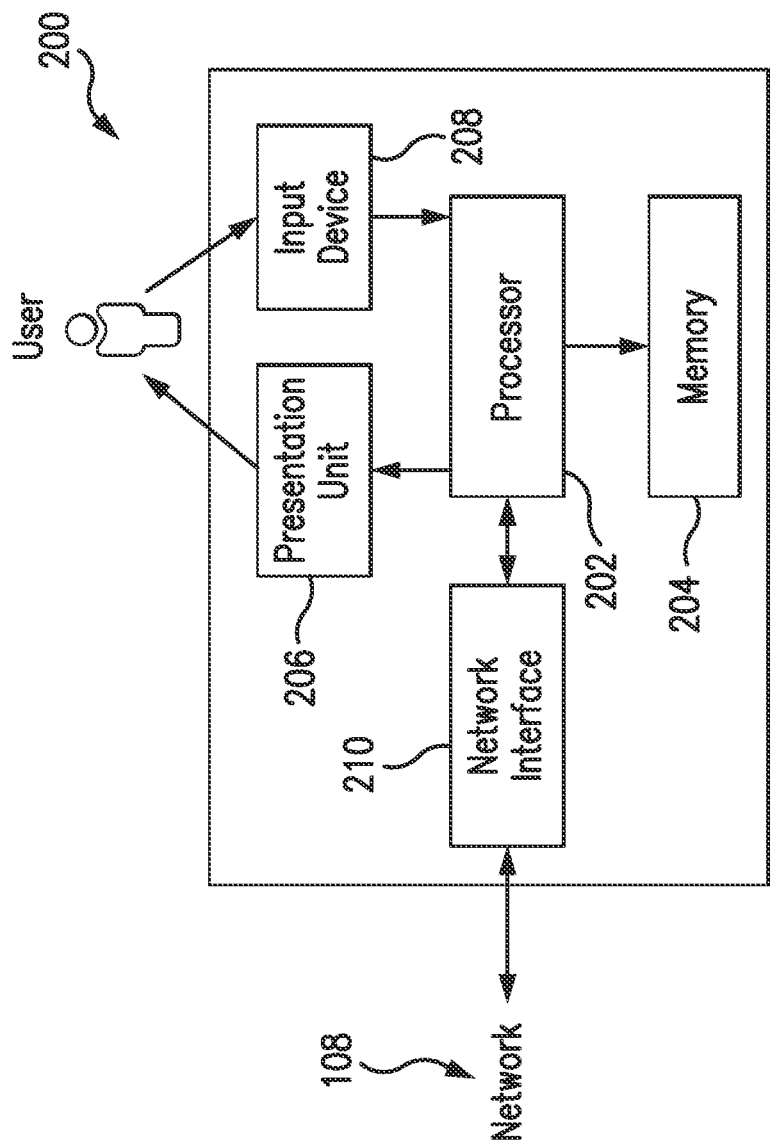
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the network provider 102, the first party 104, and the mobile device 106 should be understood as including, or being implemented in, a computing device consistent with computing device 200, coupled to (and in communication with) one or more of the networks (e.g., the network 108, etc.). In addition, the payment card 112 should be considered a computing device generally consistent with computing device 200 for purposes of the description herein. Notwithstanding the above, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), an EMV chip, a microcontroller, a reduced instruction set computer (RISC) processor, an application specific integrated circuit (ASIC), a programmable logic device (PLD), a gate array, and/or any other circuit or processor structured (e.g., by executable instructions, or programming, etc.) (e.g., as indicated by the application 116, the application 118 and/or the SDK 120, etc.) to perform the functions described herein.

The memory 204, as described herein, is one or more devices that permits data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, biometrics (e.g., reference biometrics, etc.), payment account credentials, transaction data, and/or other types of data (and/or data structures) suitable for use as described herein.

Furthermore, in various embodiments, computer-executable instructions (e.g., in the form of the application 116, the application 118 and/or the SDK 120, etc.) may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby in its configuration to perform such instructions the computing device 200 may be transformed into a special-purpose computing device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 110 at the mobile device 106 to authenticate via a biometric, etc.), etc. And various interfaces (e.g., as defined by the application 116, the application 118 and/or the SDK 120, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200, such as, for example, biometrics, etc. (e.g., at the biometric reader 114, etc.), in response to prompts from the application 118 (and/or the SDK 120, etc.), as further described below. The input device 208 may include a single input device or multiple input devices. The input device 208 is coupled to (and is in communication with) the processor 202 and may include, for example, one or more of a keyboard, a biometric sensor, a pointing device, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

That said, it should be appreciated that certain computing devices, such as, for example, the payment card 112, etc., may omit one or more of the input device 208 and/or the presentation unit 206 intended for user interaction, while including other components for facilitating computing device interactions (e.g., an EMV chip, magnetic strip, etc.).

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, a radio-frequency (RF) adapter, etc.), a mobile network adapter, or other device capable of communicating to one or more different ones of the networks herein and/or with other devices described herein. Further, in some exemplary embodiments, the computing device 200 may include the processor 202 and one or more network interfaces incorporated into or with the processor 202.

Referring again to FIG. 1, upon receipt of the payment card 112, as associated with a payment account issued to the user 110 by the first party 104 (e.g., as an issuing banking institution, etc.), the user 110 may desire to provision the payment account to the application 118 (at the mobile communication device 106), for use in subsequent transactions (e.g., for use with a virtual wallet associated with the application 118, etc.).

To do so, the user 110 accesses the application 118 in the mobile communication device 106, which, in turn, provides an interface to the user 110 (at the presentation unit 206) offering the option to add a payment account. In response to a selection of the add option, the mobile communication device 106, as configured by the application 118 and/or the SDK 120, prompts the user 110 to authenticate himself/ herself at the payment card 112 (via the biometric sensor 114) and to tap the payment card 112 on the mobile communication device 106 (which, in some embodiments, may then activate the biometric sensor 114 at the payment card 112). In connection therewith, in one or more example embodiments, the mobile communication device 106, as configured by the application 118 and/or the SDK 120, may recognize the tap through a proximity of the payment card 112 to the mobile communication device 106. For example, the application 118 and/or the SDK 120 may be configured to enable the mobile communication device 106 in an NFC reader mode, Bluetooth™ reader mode, etc., whereby the mobile communication device 106 is configured (e.g., via an NFC adapter or driver, a Bluetooth™ adapter or driver, etc.) to look for an NFC device, Bluetooth™ device, etc. (such as the payment card 112, etc.) within the proximity of the communication device 106. As such, in connection with the tap of the payment card 112 on the mobile communication device 106, the payment card 112 is moved into a vicinity of the mobile communication device 106 whereby the mobile communication device 106 recognizes (or receives a signal from) the payment card 112 (and/or vice-versa).

In addition, in one or more example embodiments, the mobile communication device 106, as configured by the application 118 and/or the SDK 120, may power the payment card 112 through a proximity of the payment card 112 to the mobile communication device 106 (e.g., via NFC, etc.). More specifically in this example, with regard to powering the payment card 112, the payment card 112 may be configured to employ a power harvesting technique, whereby the payment card 112 draws power from the NFC connection with the mobile communication device 106, and the biometric sensor 114 is then activated/powered to operate as described herein. Alternatively, in another example embodiment, the payment card 112 may include a power supply (e.g., a battery integrated on the payment card 112 and in communication with a processor of the card 112, a memory of the card 112, the biometric sensor 114, etc.), whereby the payment card 112 is powered apart from the NFC connection with the mobile communication device 106. The power supply, in such example embodiment, would power the biometric sensor 114 and/or the processor therein, thereby permitting operation as described herein.

In any case, in response to the authentication request at the mobile communication device 106, the user 110 places a finger on the biometric sensor 114 of the payment card 112 (i.e., a fingerprint sensor in this example), whereupon in this example the mobile communication device 106, as configured by the application 118 and/or the SDK 120, receives the fingerprint of the user 110 (from the payment card 112, as the biometric template, etc.) and compares the captured fingerprint to the reference biometric, also received from the payment card 112 (were the reference biometric is stored within the payment card 112 (e.g., stored in the memory of the payment card 112, etc.)). Alternatively, the comparison of the received fingerprint to the biometric template may be performed at the payment card 112 (whereby the actual biometric data (including the received fingerprint and the biometric template) is not transmitted to the mobile communication device 106)) (e.g., as described in connection with the method 300, etc.).

When the comparison yields a match (e.g., within industry applicable standards, etc.), the payment card 112 is configured to permit access to and/or broadcast the payment account credential included in the payment card 112, along with the result of the comparison (e.g., the authentication of the user 110, etc.). The payment account credential may include a primary account number (PAN), token, expiration date, card verification code (CVC), user identifier for the user 110, mailing address for the user 110, billing address, etc. However, when the comparison does not yield a match (e.g., within industry applicable standards, etc.), the payment card 112 is configured to not permit access to and/or not broadcast the payment account credential. In at least one embodiment, though, the payment card 112 may still be configured to permit access to and/or broadcast the result of the comparison (e.g., an indication that the user 110 is not authenticated, etc.) when the comparison does not yield a match. In any case, the result of the biometric comparison may include any suitable number, code, indicator, etc., which is indicative of the result of the comparison and understood by the network provider 102, first party 104, etc. (e.g., that a match was determined or not, a percentage confidence in the accuracy of the match (or other numerical indicator relating thereto), etc.).

It should be appreciated that the payment card 112 may be configured to encrypt the payment account credential (e.g., the PAN, etc.) and/or the authentication result, based on a certificate and/or key included therein, prior to permitting access to and/or broadcasting the same. In this exemplary embodiment, the payment card 112 may be provisioned with a key, such as, for example, a private key, when issued by the first party 104 and/or associated with the network provider 102. This private key may then be used in connection with communications with the mobile communication device 106, and specifically, the application 118, and beyond to encrypt such data (e.g., when transmitted by the mobile communication device 106 to the first party 104, etc.).

In addition, when the biometric is captured by the payment card 112, the mobile communication device 106, as configured by the application 118 and/or the SDK 120, detects a tap of the payment card 112 on the mobile communication device 106. In response to the tap, the mobile communication device 106, as configured by the application 118 and/or the SDK 120, wirelessly connects with the payment card 112 (e.g., via a wireless connection, etc.) to receive and/or read the authentication result and/or the payment account credential from the payment card 112 (and/or to receive the captured biometric for the user 110 and the stored reference biometric from the payment card 112 for comparison). Conversely, upon being powered and/or tapped, the payment card 112 may be configured to automatically connect to the mobile communication device 106 (when within range), wirelessly, and to transmit the above information to the mobile device 106 (e.g., without such a tap, etc.). In turn, when the user 110 is authenticated (against the biometric reference) (either by the mobile communication device 106 or the payment card 112), the mobile communication device 106, as configured by the application 118 and/or the SDK 120, transmits the payment account credential and the authentication result to the first party 104, via the network provider 102. When transmission is through the network provider 102, the network provider 102 optionally may be configured to (decrypt, as needed, and) confirm the payment account credential as associated with a payment account and/or the first party 104 associated with contactless provisioning, as described herein, prior to transmitting the payment account credential and the authentication result on to the first party 104. The first party 104, in turn, is configured to decrypt (as necessary) and verify the payment account credential and the authentication result, and then to provide approval for provisioning of the payment account to the mobile communication device 106, via the network provider 102. The first party 104 is also configured to transmit a notification to the user 110 regarding the provisioning. In connection therewith, the network provider 102 (e.g., via MDES, etc.) is configured to generate a token associated with the payment account credential and to provide the token to the mobile communication device 106 in lieu of or along with the approval for provisioning the payment account to the mobile communication device 106 (whereby the token may then be used in subsequent transactions to the user's payment account).

It should be appreciated that in at least one embodiment, the mobile communication device 106 may be configured to communicate directly with the first party 104 (i.e., apart from the network provider 102) to pass the payment account credential and/or authentication result (consistent with above). And then, the first party 104 may be configured to communicate a response directly to the mobile communication device 106 (i.e., apart from the network provider 102).

In response to the first party 104 providing approval for the provisioning (and/or upon receipt of the corresponding token for the user's payment account), the mobile communication device 106, as configured by the application 118 and/or the SDK 120, stores the payment account credential and/or a token associated therewith (as received from the network provider 102) in memory of the mobile communication device 106 (and accessible, for example, by a wallet associated with the application 118, or separate therefrom), for use in subsequent payment account transactions.

FIG. 3 illustrates an exemplary method 300 for use in provisioning a payment account, associated with a wireless enabled payment card, to a wallet application of a mobile communication device. The exemplary method 300 is described as implemented in the mobile communication device 106, the payment card 112, and the first party 104 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset in the method 300, when the user 110 desires to provision the contactless payment card 112 (and specifically, the payment account associated therewith) to the application 118 (broadly, to the mobile communication device 106), the user 110 opens the application 118 and requests, at 302, to add a new payment card in the application 118. In response, the mobile communication device 106 (as directed by the application 118 and/or the SDK 120) prompts, at 304, the user 110 to authenticate himself/herself to the payment card 112 and to tap the payment card 112 on the mobile communication device 106. In response to a tap, the NFC network interface of the mobile communication device 106 (or other network interface) is enabled to communicate and/or connect with NFC-enabled devices (or Bluetooth™ enabled devices, or other wireless-enabled devices) within proximity of the mobile communication device 106 (e.g., the payment card 112, etc.). In addition, in various embodiments, such tap also activates the application 116 at the payment card 112 (e.g., powers the application 116, initiates the application 116, etc.). It should be appreciated that the selection of adding a new card at the application 118 may include the option to add a new card via NFC (or more generally, add a new card wirelessly) whereby the NFC or other wireless network interface of the mobile communication device 106 is enabled to communicate with and/or connect to a wireless-enabled payment card (such as the payment card 112) in the vicinity of the mobile communication device 106 (i.e., whereby an actual "tap" may be omitted, unneeded or superfluous).

Consistent with the prompt from the mobile communication device 106, the user 110 applies his/her finger to the biometric sensor 114 of the payment card 112, at 306. The payment card 112 (as directed by the application 116 therein) captures, at 308, the fingerprint and, in this embodiment, compares at the payment card 112 (e.g., via a processor, via the application 116, etc.), at 310, the captured fingerprint to a biometric reference (e.g., a reference fingerprint template, etc.) stored in memory 204 of the payment card 112. The payment card 112 relies on conventional techniques to determine if there is a match between the captured fingerprint and the biometric reference as defined by relevant industry standards. Specifically, for example, a match is identified based on whether the matching score (or similarity score) associated with the captured fingerprint and the biometric reference satisfies a matching threshold value. In one example, when the captured fingerprint is matched against the stored biometric reference, the outcome of the comparison is a matching score that is then compared to a threshold, where a matching score above the threshold is a "match" and a matching score below the threshold is a "non-match." Consequently, based on the comparison, the payment card 112 either authenticates the user 110, or not.

When the user 110 is authenticated, the payment card 112 (as directed by the application 116 therein) encrypts the payment account credential included in the memory 204 of the payment card 112 (e.g., a PAN, expiration date, etc.) and broadcasts, at 312, the encrypted payment account credential and an authentication result for the user 110 (based on the fingerprint comparison). The data is encrypted, by the payment card 112, based on a key included in the payment card 112. It should be appreciated that in other embodiments, the data may be unencrypted when broadcast and/or transmitted from the payment card 112 to the mobile communication device 106, and that the mobile communication device 106 may then encrypt the data (e.g., based on a key, etc.) and transmit the encrypted data to the network provider 102 (e.g., to MDES, etc.) (e.g., to maintain security of the data, etc.), as described more below. Conversely, when the user 110 is not authenticated, the payment card 112 ends the process, at 314, whereby no payment account credential is broadcast. Optionally, the payment card 112 (as directed by the application 116 therein) may broadcast an authentication result, indicating the user 110 was not authenticated (e.g., authentication failed, etc.). In such later scenarios, where the user 110 is not authenticated, the mobile device 106 may receive the authentication failed result and display a message to the user 110, at the mobile device 106, indicating that the payment card 112 cannot be added to the device 106.

In addition, again, as prompted, the user 110 may tap the payment card 112, at 316, on the mobile communication device 106. In response to the tap (or the request to add a new card), the mobile communication device 106 enables the NFC network interface associated therewith (e.g., the network interface 210, etc.) to communicate and/or connect with the payment card 112 (and/or to power the payment card 112, etc.). Thereafter, or within an interval of the tap, the mobile communication device 106 (as directed by the application 118 and/or the SDK 120) receives and/or reads the broadcasted payment account credential and authentication result, at 318. The authentication result, again, may include any number, code or indicator of whether there was a match or a non-match of the biometric (e.g., fingerprint, etc.) received at the payment card 112.

In turn, the mobile communication device 106 (as directed by the application 118 and/or the SDK 120) receives the payment account credential and the authentication result and encrypts and/or decrypts the data (as necessary/appropriate). Specifically, when the data received from the payment card 112 is encrypted, the mobile communication device 106 either may decrypt and then re-encrypt the data, or the device 106 may leave the data encrypted. Conversely, when the received data is not encrypted, the mobile communication device 106 may encrypt the data. Thereafter, the mobile communication device 106 (as directed by the application 118 and/or the SDK 120) transmits, at 320, the encrypted payment account credential and the authentication result toward the first party 104 (which is the issuer of the payment card 112 in this example), via the network provider 102 (e.g., without storing the same in memory of the mobile communication device 106, etc.).

In turn, the payment account credential and the authentication result is received at the network provider 102, whereupon the network provider 102 determines which first party the payment account credential is associated with (i.e., to know where to transmit the same) and determines whether the payment account credential is within a range of contactless-enabled payment cards. To do so, the network provider 102 decrypts the payment account credential, based on a key associated with the encryption (i.e., as exchanged between the network provider 102 and the application 116, etc.), and looks up the payment account credential (e.g., the PAN, etc.) in a data structure (not shown) in memory (e.g., memory 204, etc.) of the network provider 102. It should be appreciated that the data structure may include a listing of PANs or range of PANs, for example, which are associated with accounts for which contactless payment cards have been issued, for which the associated user has agreed to contactless provisioning as described herein, and/or for which the issuer of the given cards has agreed to contactless provisioning as described herein, etc. The data structure may be compiled based on input from various account issuers, including, in this embodiment, the first party 104. When the payment account credential is listed in the data structure and/or within a range listed in the data structure, the network provider 102 determines the credential is "within range." After, the network provider 102 encrypts the data (by use of a key shared with the first party 104) and transmits, at 322, the payment account credential and the authentication result to the first party 104.

In response, the first party 104 verifies, at 324, the encrypted payment account credential. To do so, the first party 104 decrypts the payment account credential through use of the shared key with the network provider 102. In addition, the first party 104 verifies the authentication result (after it is decrypted in a similar manner). When the data from the mobile device 106 is verified, the first party 104 transmits, at 326, an approval to provision the payment account and/or the payment card 112 to the network provider 102. The approval or decline may be provided as a number, code or other indicator, which is understood by the network provider 102 and/or the mobile communication device 106. Additionally, the first party 104 also communicates with the user 110 (e.g., via an SMS message, an email, an app-enabled message, etc.) that a new payment card has been provisioned to the application 118 and/or the mobile communication device 106.

The network provider 102, in turn, upon receipt of an approval, generates, at 328, a token associated with the payment account credential. The token includes, generally, a payment token associated with the user's payment account, whereby it may be provided in lieu of the payment account credential for the payment account to the application 118 at the mobile communication device 106. The network provider 102 then transmits, at 330, the token to the mobile communication device 106. The network provider 102 further stores the token in a token data structure, whereby the token may be converted to the payment account credential in connection with one or more subsequent transactions, which includes the token.

Finally, at 332 in the method 300, the mobile communication device 106 (as directed by the application 118 and/or the SDK 120) provisions the payment account associated with the payment card 112 (as defined by the payment account credential and/or the token) to the application 118 (and, broadly, to the mobile communication device 106) for use in subsequent payment account transactions. This includes, generally, storing the payment account credential and/or the token generated by the network provider 102 in memory (e.g., a trusted execution environment (TEE) and/or secure element (DE) in the memory 204, etc.). The payment account credential and/or the token may then be provided, by the mobile communication device 106, in connection with the subsequent payment account transactions.

In view of the above, the systems and methods herein generally provide for a streamlined process for users to provision accounts to wallet applications at their mobile devices, without using (or requiring) conventional two-factor authentication (e.g., without the users having to directly contact the issuing institutions associated with their payment accounts, etc.). Instead, by way of the systems and methods herein, the users may simply authenticate themselves to their payment devices and establish local communication between the payment devices and the mobile devices (e.g., by taping their payment devices on their mobile devices, by utilizing their mobile devices to recognize their payment devices (e.g., via NFC communication or other local wireless communication, etc.), etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a mobile device, a request to provision an account to a mobile device; (b) prompting a user associated with the account for authentication at a wireless device associated with the account, wherein the wireless device is different than the mobile device; (c) receiving, at the mobile device, an account credential from the wireless device, via a local wireless communication between the mobile device and the wireless device, when the user is authenticated at the wireless device; (d) transmitting the account credential toward a first party associated with the account, whereby the account credential is indicative of the authentication of the user at the wireless device; (e) provisioning the account to the mobile device, in response to an approval received from the first party; (f) detecting a tap of the wireless device at the mobile device and enabling wireless communication with the wireless device, in response to the detected tap; (g) enabling wireless communication with the wireless device in response to the received request, thereby powering the wireless device; (h) receiving, by the mobile device, an authentication result from the wireless device; and (i) transmitting the authentication result toward the first part along with the account credential.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in provisioning an account to a mobile device, the method comprising:
 receiving, at a mobile device, a request to provision an account to the mobile device;
 prompting a user associated with the account for authentication at a wireless card device associated with the account to tap the wireless card device on the mobile device, wherein the wireless card device is physically distinct from the mobile device;
 identifying a tap from the wireless card device;
 in response to the tap, receiving, at the mobile device, an account credential from the wireless card device, via a local wireless communication between the mobile device and the wireless card device, based on the user being authenticated at the wireless card device;
 transmitting the account credential toward a first party associated with the account, whereby the account credential is indicative of the authentication of the user at the wireless card device; and
 provisioning the account to the mobile device, in response to an approval received from the first party.

2. The computer-implemented method of claim 1, wherein transmitting the account credential toward the first party includes encrypting the account credential, based on an encryption key associated with a network provider, and transmitting the encrypted account credential to the network provider, thereby permitting the network provider to transmit the account credential to the first party.

3. The computer-implemented method of claim 1, further comprising enabling the wireless communication with the wireless card device, in response to the identified tap.

4. The computer-implemented method of claim 3, wherein the wireless card device includes a payment card; and
wherein receiving the account credential from the wireless card device includes receiving a payment account credential from the payment card, in response to the identified tap of the payment card at the mobile device.

5. The computer-implemented method of claim 1, further comprising enabling the local wireless communication with the wireless card device in response to the received request, thereby powering the wireless card device.

6. The computer-implemented method of claim 5, further comprising activating a biometric sensor of the wireless card device in response to enabling the local wireless communication.

7. The computer-implemented method of claim 1, wherein provisioning the account to the mobile device includes receiving a token from a network provider and storing the token in memory of the mobile device, thereby permitting the mobile device to provide the token to a merchant in connection with an account transaction.

8. The computer-implemented method of claim 1, further comprising:
receiving, by the mobile device, an authentication result from the wireless card device; and
transmitting the authentication result toward the first party along with the account credential.

9. The computer-implemented method of claim 8, wherein the mobile device includes a payment application, and wherein provisioning the account to the mobile device includes provisioning the account to the payment application; and
wherein the wireless card device includes a biometric enabled contactless payment card.

10. A system for use in provisioning a payment account to a payment application of a mobile device, the system comprising:
a mobile device including a memory and a processor coupled to the memory, the processor configured to:
receive a request to provision an account to the mobile device;
prompt a user associated with the account for authentication at a wireless card device associated with the account to tap the wireless card device on the mobile device, wherein the wireless card device is physically distinct from the mobile device;
identify a tap from the wireless card device;
in response to the tap, receive an account credential from the wireless card device, via a local wireless communication between the mobile device and the wireless card device, based on authentication of the user at the wireless card device;
transmit the account credential toward a first party associated with the account, whereby the account credential is indicative of the authentication of the user at the wireless card device; and
provision the account to the mobile device, in response to an approval received from the first party.

11. The system of claim 10, wherein the mobile device further includes a network interface, which is configured for near-field communication (NFC); and
wherein the processor is configured to receive the payment account credential via a NFC connection with the wireless card device.

12. The system of claim 11, wherein the processor is configured to enable the network interface for the NFC connection with the wireless card device in response to the tap between the wireless card device and the mobile device.

13. The system of claim 10, wherein the processor is further configured to encrypt the account credential; and
wherein the processor is configured, in connection with transmitting the account credential, to transmit the encrypted account credential.

14. The system of claim 10, further comprising the wireless card device having a memory and a biometric sensor coupled to the memory; and
wherein the wireless card device is configured to:
capture a fingerprint of the user at the biometric sensor;
compare the captured fingerprint to a reference biometric stored in the memory of the wireless card device; and
transmit the account credential to the mobile device in response to a match between the captured fingerprint and the reference biometric.

15. The system of claim 14, wherein the wireless card device includes a payment card.

16. The system of claim 10, wherein the processor of the mobile device is configured, in order to provision the account to the mobile device, to receive a token from a network provider and store the token in the memory of the mobile device, thereby permitting the mobile device to provide the token to a merchant in connection with an account transaction.

17. A non-transitory computer-readable storage medium including computer-executable instructions for use in provisioning a payment account to a payment application of a mobile device, which, when executed by a processor of the mobile device, cause the processor to perform the steps of:
receiving a request to provision an account to a mobile device;
prompting a user associated with the account for authentication at a wireless card device associated with the account to tap the wireless card device on the mobile device, wherein the wireless card device is physically distinct from the mobile device;
identify a tap from the wireless card device;
in response to the tap, receiving an account credential from the wireless card device, via a local wireless communication between the mobile device and the wireless card device, based on when the user being authenticated at the wireless card device;
transmitting the account credential toward a first party associated with the account, whereby the account credential is indicative of the authentication of the user at the wireless card device; and
provisioning the account to the mobile device, in response to an approval received from the first party.

18. The non-transitory computer-readable storage medium of claim 17, wherein the executable instructions, when executed by the processor, further cause the processor to perform the steps of:

enabling wireless communication with the wireless card device, in response to the identified tap.

\* \* \* \* \*